United States Patent
Previtali et al.

(10) Patent No.: US 9,473,881 B2
(45) Date of Patent: Oct. 18, 2016

(54) MOBILE TERMINALS LOCATING

(71) Applicant: STREAMWIDE, Paris (FR)

(72) Inventors: Florent Previtali, Paris (FR); Mathieu Grandjean, Montreuil (FR)

(73) Assignee: STREAMWIDE, Paris (FR)

( * ) Notice: Subject to any disclaimer, the term of this patent is extended or adjusted under 35 U.S.C. 154(b) by 103 days.

(21) Appl. No.: 14/177,508

(22) Filed: Feb. 11, 2014

(65) Prior Publication Data

US 2014/0228047 A1    Aug. 14, 2014

(30) Foreign Application Priority Data

Feb. 12, 2013  (FR) ...................... 13 51196

(51) Int. Cl.
| | |
|---|---|
| *H04W 24/00* | (2009.01) |
| *H04W 4/02* | (2009.01) |
| *H04L 12/24* | (2006.01) |
| *H04W 56/00* | (2009.01) |
| *H04W 8/12* | (2009.01) |

(52) U.S. Cl.
CPC ............ *H04W 4/02* (2013.01); *H04L 12/2424* (2013.01); *H04W 8/12* (2013.01); *H04W 56/0015* (2013.01)

(58) Field of Classification Search
CPC .................................................. H04W 64/00
See application file for complete search history.

(56) References Cited

U.S. PATENT DOCUMENTS

2007/0177530 A1*  8/2007  Ando ...................... H04W 8/26
370/277

FOREIGN PATENT DOCUMENTS

| WO | WO 01/69948 | 9/2001 |
|---|---|---|
| WO | WO 2007/145552 | 12/2007 |

OTHER PUBLICATIONS

French Preliminary Search Report and Written Opinion dated Aug. 1, 2013 for Application No. FR 1351196.

* cited by examiner

*Primary Examiner* — Justin Lee
(74) *Attorney, Agent, or Firm* — Frost Brown Todd LLC

(57) ABSTRACT

The invention relates to locating mobile terminals comprising a plurality of recording servers, adapted to communicate with recorded mobile terminals, for communication relays, with the recording servers communicating between them and with location servers via an extended network and organized in a hierarchical tree of parent servers and child servers. Each location server comprises a database of mobile terminals constituted of a plurality of mobile terminal records, each of said mobile terminal records comprising address data of a mobile terminal recorded with a descending recording server of said location server in the hierarchical tree.

2 Claims, 4 Drawing Sheets

MOBILE TERMINALS LOCATING

BACKGROUND

This invention relates to the locating of mobile terminals by a recording server, and to the recording and synchronising of a mobile terminal with a system for location mobile terminals.

Users of mobile terminals such as for example mobile telephones, Smartphones and digital tablets increasingly use messaging functionalities via internet, and this in order to, in particular, reduce the costs linked to exchanging messages via the cellular networks and to access extended functionalities that are made possible by using the internet network.

In such a message system, each mobile terminal is recorded with a recording server which is used as a communication relay and it is therefore required, when a mobile terminal A wants to transmit a message to a mobile terminal Z, that the recording server, with which is recorded the mobile terminal A, locate the recording server with which is recorded the mobile terminal Z in order to transmit the message to it.

Such locating is usually carried out by means of a system for locating mobile terminals which is thus a system subjected to a very high load when the service is used.

It is therefore advantageous to distribute the operation of this system over several servers.

For this purpose, architectures of the domain name system or "DNS" type (used for example over the internet network) are known which consists of a tree structure wherein a server to be located is identified by means of a domain name representing the path to be travelled in the opposite direction, for example "trac.mgm.streamwide.com".

Architectures of the telephone network type are also known, wherein the communications are directed by identifying telephone number prefixes.

Such architectures operate by prefixes and/or suffixes and therefore carry out a distribution of the users according to a telephone number or a domain name.

Consequently, these systems do not make it possible to easily transfer users from one recording server to another since the address (domain name or telephone number) is registered in memory and conditions the routing to be carried out.

The possibility of transferring mobile terminals between several recording servers dynamically ("on the fly") is useful for example during ramping-up stages of the message system but also to optimise the distribution during operation as it makes it possible to best organise the location requests and the routing of messages, for example by recording mobile terminals which communicate frequently together on the same recording server or neighbouring recording servers.

There is therefore a need for a system for locating mobile terminals that allows for an easy transfer of mobile terminals between recording servers as well as a distribution of mobile terminals between the recording servers according to a set of criteria that is wider than a simple telephone number or domain name, for example according to the type of mobile terminal, to the messaging application available on the mobile terminal, to the load of the recording servers, etc.

SUMMARY

The present invention aims at improving the situation.

To this effect, it proposes a system for locating mobile terminals comprising a plurality of recording servers and a plurality of location servers. Each recording server is adapted to communicate with several mobile terminals recorded with the recording server, in order to carry out a communication relay. The recording servers and the location servers are able to communicate with each other via an extended network and are organised according to a hierarchical tree of parent servers and of child servers in such a way that:
- each recording server has a single parent server constituted by a location server;
- each location server has either a single parent server constituted by a location server, or no parent server;
- at least one location server from among the plurality of location servers has a parent server.

Each location server comprises a database of mobile terminals constituted of a plurality of mobile terminal records. Each of these mobile terminal records comprises address data of a mobile terminal recorded with a recording server descending from the location server in the hierarchical tree.

As such, such a tree structure advantageously makes it possible to locate a terminal in a parent server if the address data of this terminal is not present in the base of the server connected directly to the terminal.

In an embodiment, the address data of a mobile terminal includes an address, on the extended network, of a recording server with which this mobile terminal is recorded.

In an embodiment, a single location server does not have a parent server and as such constitutes a root location server.

In an embodiment, a location server, parent in the hierarchical tree, comprises all of the records contained in a recording or location server, downstream of this parent location server in the hierarchical tree.

This invention further relates to a method of locating a mobile terminal by a recording server of a system for locating mobile terminals in terms of the invention. The method comprises a local determination in order to determine if a mobile terminal sought is recorded with a recording server, and, if the mobile terminal sought is not recorded with the recording server, a first step of regional determination in order to determine if the database of mobile terminals of a first location server constituting the single parent server of the recording server comprises a mobile terminal record that comprises address data of the mobile terminal sought.

Furthermore, if the database of mobile terminals of the first location server comprises a mobile terminal record comprising address data of the mobile terminal sought, the first location server transmits this record to the recording server.

On the other hand, if the database of mobile terminals of the first location server does not comprise a mobile terminal record comprising address data of the mobile terminal sought, a second step of regional determination consisting in determining if the database of mobile terminals of a second location server constituting the single server, parent, of the first location server comprises a mobile terminal record comprising address data of the mobile terminal sought.

"Regional determination", as opposed to local determination, means a determination carried out with a parent server, above one or several downstream servers in the tree structure.

In an embodiment, the second step of regional determination is reiterated one or several times by going back up the hierarchical tree structure, with all of the steps of regional determination constituting a set of n-th steps of regional determination. Each n-th step of regional determination consists in determining if the database of mobile terminals of an n-th location server constituting the single parent server of an (n−1)-th server comprises a mobile terminal record comprising address data of the mobile terminal sought. The reiteration of the n-th steps of regional determination is then stopped when the database of mobile terminals of an n-th location server comprises a mobile terminal record comprising address data of the mobile terminal sought.

In an embodiment, if the mobile terminal sought is not recorded with an (n−1)-th location server during an (n−1)-th step of regional determination, the n−1-th location server transmits to the n-th location server, constituting its single parent, a location request.

Alternatively, if the mobile terminal sought is not recorded with an (n−1)-th location server during an (n−1)-th step of regional determination, the (n−1)-th location server transmits to the recording server an address, over the extended network, of the n-th location server constituting its single parent, and the recording server emits a location request to the n-th location server.

In a more general embodiment, when the database of mobile terminals of a location server comprises a mobile terminal record comprising address data of the mobile terminal sought, a local database of the recording server is advantageously updated with this mobile terminal record and, the step of local determination in order to determine if a mobile terminal sought is recorded with a recording server further comprises the operation of determining if the local database of the recording server comprises a mobile terminal record comprising address data of the mobile terminal sought.

This invention further relates to a method for recording a mobile terminal in a system for location mobile terminals, with the method comprising:
- a step of local recording of a mobile terminal to be recorded with a recording server;
- a first step of regional recording of the mobile terminal to be recorded in the database of mobile terminals of a first location server constituting the single parent server of the recording server; and
- a second step of regional recording of the mobile terminal to be recorded in the database of mobile terminals of a second location server constituting the single parent server of the first location server.

Such an embodiment makes it possible in a particularly advantageous manner to synchronise the data on the terminals, shared by the servers, and as such to dynamically update the location data of terminals.

In an embodiment, the aforementioned second step of recording is reiterated one or several times by going back up the hierarchical tree structure, with all of the steps of regional recording constituting a set of n-th steps of regional recording. Each n-th step of regional recording then consists in recording the mobile terminal to be recorded in the database of mobile terminals of an n-th location server constituting the single parent server of an n−1-th location server. The reiteration of the n-th steps of regional recording is then stopped when an n-th location server does not have a parent server.

In an embodiment, each step of regional recording comprises the emission of a recording request for a mobile terminal from a first server to the second server constituting the unique parent of the first server.

In an embodiment, each step of regional recording comprises the emission of a recording request for a mobile terminal from the recording server to a location server.

In an embodiment, the method for recording a mobile terminal further comprises a step of assigning, carried out prior to the first step of recording, and comprising the transmission of a request for assigning from the mobile terminal to a location server then the receiving on the mobile terminal of an address, over the extended network, of a recording server. The step of local recording then comprises the recording of the mobile terminal with the recording server.

This invention further relates to a method of synchronising a mobile terminal with a system for locating mobile terminals according to the invention, with the method comprising:
- a step of transferring a plurality of address book records from a mobile terminal to be synchronised to a recording server, with at least one of said address book records comprising a mobile terminal contact identifier;
- a step of sorting the address book in order to determine, for each address book record comprising a mobile terminal contact identifier, if the database of mobile terminals of a location server comprises a mobile terminal record comprising address data of the mobile terminal contact, in order to define mobile terminal contact information; and
- a step of updating comprising the transmission of the mobile terminal contact information to the mobile terminal to be synchronised.

Other characteristics and advantages of the invention shall appear when reading the description and when examining the drawings wherein:

BRIEF DESCRIPTION OF THE DRAWINGS

In the various figures, the same references designate identical or similar elements.

DETAILED DESCRIPTION

Figure 1:
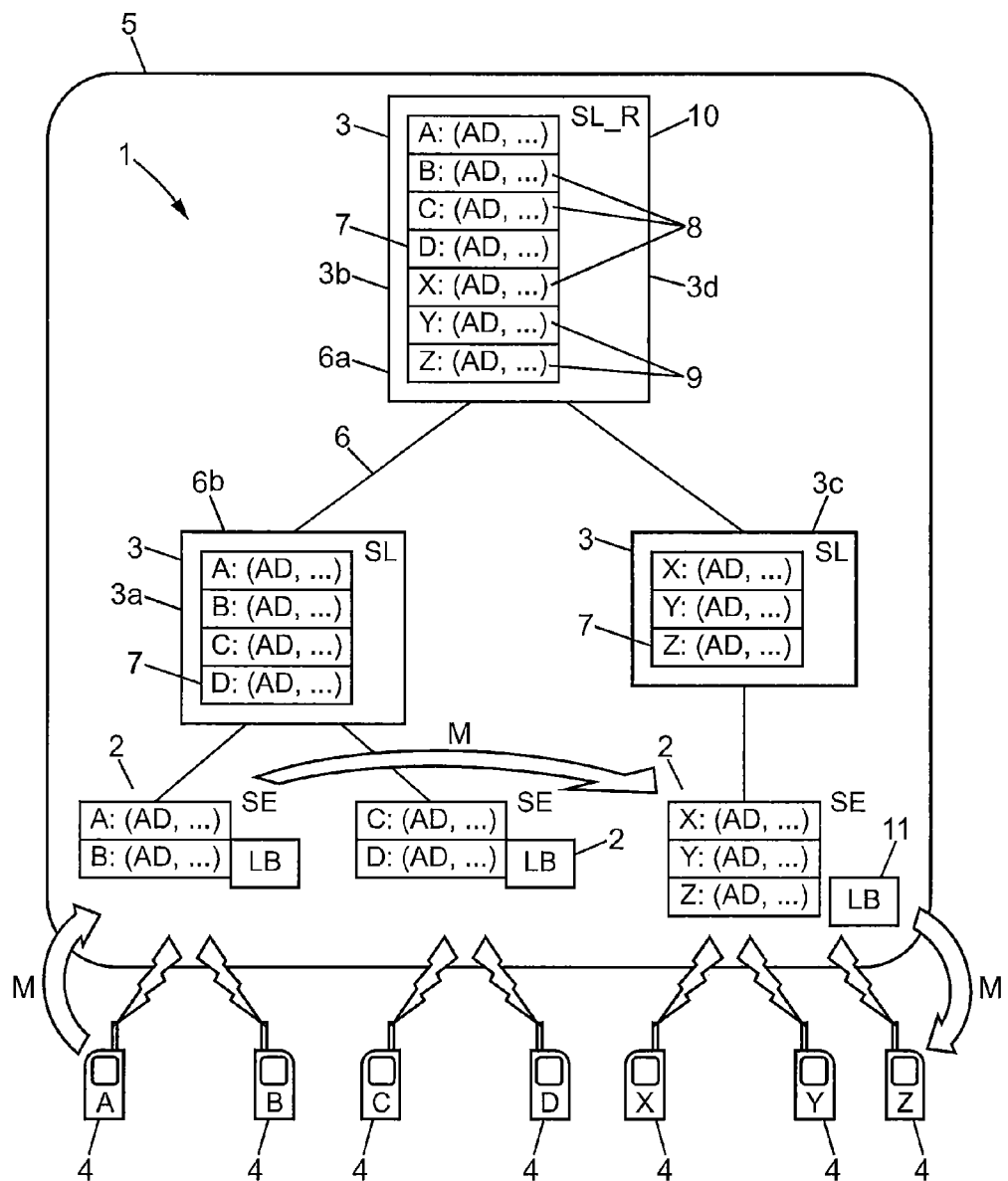
FIG. 1 is a flowchart of a system for locating mobile terminals according to an embodiment of the invention.

FIG. 1 shows an embodiment of a system 1 for locating mobile terminals according to the invention. This system comprises a plurality of recording servers 2 and a plurality of location servers 3.

Each recording server 2 is adapted to communicate with a plurality of mobile terminals 4 recorded with said recording server 2 for a communication relay.

Each recording server 2 may communicate with the plurality of mobile terminals 4 recorded with it directly by the intermediary of a cellular network or by the intermediary of a server acting as a relay with a cellular network.

As mobile terminals 4 are not generally able to communicate directly with each other by the intermediary of an extended network such as internet, the recording servers 2 carry out communication relays in order to allow the mobile terminals 4 to exchange messages via the extended network 5.

The recording servers 2 are able to communicate with each other via an extended network 5 which is for example an internet or intranet network.

As such, when a mobile terminal A wants to send a message M to a mobile terminal Z, the recording server 2 with which is recorded the mobile terminal A receives the message M from the mobile terminal A and sends it to the recording server 2 with which is recorded the mobile terminal Z which sends it to the mobile terminal Z.

The recording server 2 of the mobile terminal A must therefore first obtain the address AD, over the extended network 5, of the recording server 2 with which is recorded the mobile terminal Z.

For this purpose, the recording servers 2 are able to communicate with location servers 3, for example via the extended network 5.

Each location server 3 comprises a database 7 of mobile terminals constituted of a plurality of mobile terminal records 8 as detailed hereinafter.

Each mobile terminal record 8 is associated with a mobile terminal 4 recorded with a recording server 2.

A mobile terminal record 8 comprises in particular address data 9 of the associated mobile terminal 4.

The address data 9 of the associated mobile terminal 4 includes the address AD, over the extended network 5, of the recording server 2 with which is recorded said mobile terminal 4.

The mobile terminal records 8 may further comprise other information relative to the associated mobile terminal 4 and for example the type of terminal, information concerning the mobile terminal 4, for example the telephone number, information concerning the messaging application via internet installed on the mobile terminal, etc.

The recording servers 2 and the location servers 3 are furthermore organised into a hierarchical tree 6 of parent servers 6a and of child servers 6b.

The hierarchical tree 6, also called "tree structure", or "hierarchical tree structure" is such that:
 each recording server 2 has a single parent server 6a constituted by a location server 3;
 each location server 3 has either a single parent server 6a constituted by a location server 3, or no parent server 6a;
 at least one location server 3 among a plurality of location servers 3 has a parent server 6a

The child servers 6b are the reciprocals of the parent servers 6a, i.e. if a server A has for parent server 6a a server B, the server A is a child server 6b of the server B and reciprocally.

In this way, each location server 3 has one or several child servers 6b, said child servers 6b being location servers 3 and/or recording servers 2.

The servers of the tree structure 6 that do not have child servers 6b are called leaves.

The servers of the tree structure 6 form "branches" constituted by the links between a parent server and a child server.

In the embodiment of FIG. 1, the recording servers 2 do not have any child servers 6b and therefore constitute the "leaves" of the hierarchical tree 6.

As mentioned hereinabove, each location server 3 comprises a database of mobile terminals 7 constituted of a plurality of mobile terminal records 8. Each of the mobile terminal records 8 of a location server 3 comprises address data 9 of a mobile terminal 4 recorded with a recording server 2 descending from said location server 3 in the hierarchical tree 6.

"A server A descending from the server B in the hierarchical tree" or " a server A downstream of the server B in the hierarchical tree" means that the server A belongs to the branch of the hierarchical tree 6 descending starting from the server B until the leaves of the hierarchical tree 6, i.e. that the server A is a child server of the server B or a child server of a child server of the server B or a child server of a child server of a child server of the server B, etc.

Each location server 3 comprises as such, in its database 7 of mobile terminals, all of the records 8 contained in the database of mobile terminals of a server located downstream of said location server 3 in the tree structure 6.

In an embodiment, each location server 3 may comprise all of the records 8 contained in each server located downstream of said location server 3 in the tree structure 6.

In an embodiment of the invention, each location server 3 comprises only all of the records 8 contained in each server located downstream of said location server 3 in the tree structure 6. In this way, the databases 7 are of reduced size.

In the embodiment of FIG. 1, a single location server 10 does not have a parent server 6a and constitutes the root location server 10.

In an embodiment, the root location server 10 comprises all of the records 8 contained in each server of the tree structure 6.

Figure 2:
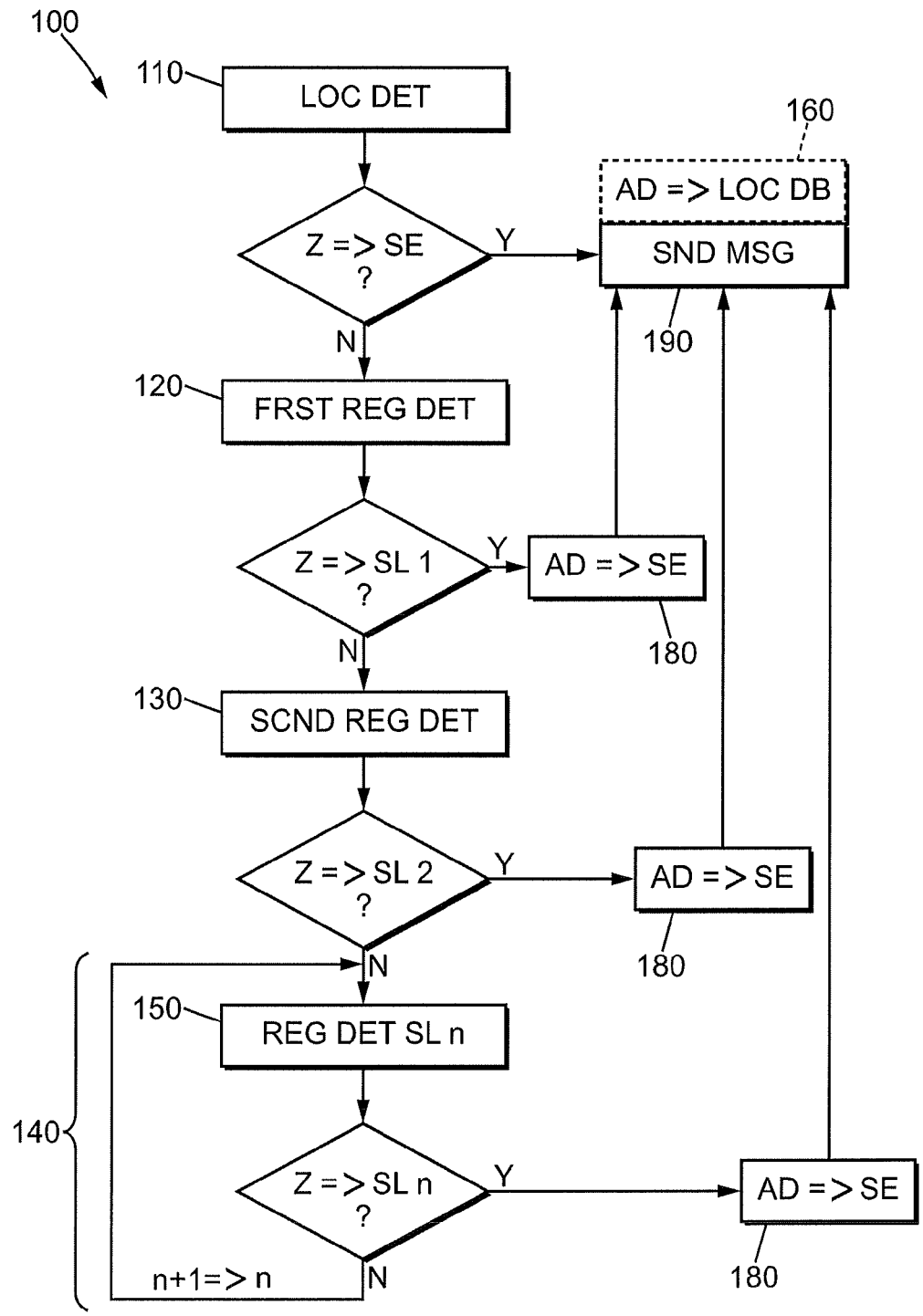
FIG. 2 is an organisational chart of a method for locating a mobile terminal via a recording server of a system for locating mobile terminals, according to embodiments of the invention.

FIG. 2 shows a method for locating 100 a mobile terminal 4 by a recording server 2 of a system for locating mobile terminals according to an embodiment of the invention.

In the embodiment of FIG. 2, the method comprises a first step of local determination 110 in order to determine if a mobile terminal sought Z is recorded with a recording server 2.

This recording server 2 is for example the recording server with which is recorded a mobile terminal A wanting to send a message M to a mobile terminal sought Z.

If the mobile terminal sought Z is recorded with the recording server 2, the two mobile terminals A, Z are therefore recorded with the same recording server 2 and it is not necessary for the recording server 2 to communicate by the intermediary of the extended network 5 with another recording server 2 in order to transmit the message M between the mobile terminal A and the terminal Z.

The message M is then transmitted 190 from the mobile terminal A to the mobile terminal Z.

If the mobile terminal sought Z is not recorded with the recording server 2, the method comprises a first step of regional determination 120 in order to determine if the database 7 of mobile terminals of a first location server 3a constituting the single parent server 6a of the recording server 2 comprises a mobile terminal record 8 comprising address data 9 of the mobile terminal sought Z.

If the database 7 of mobile terminals of the first location server 3a comprises a mobile terminal record 8 comprising address data 9 of the mobile terminal sought Z, the first location server 3a transmits 180 said record, or the address data contained in said record to the recording server 2.

The recording server 2 is then in possession of the address AD over the extended network 5 of the recording server 2 with which is recorded the mobile terminal sought Z and may be used as a communication relay.

If the database 7 of mobile terminals of the first location server 3a does not comprise a mobile terminal record associated with the mobile terminal sought Z, it is necessary to go up higher into the hierarchical tree 6.

The method for locating of FIG. 2 comprises as such a second step of regional determination 130 consisting in determining if the database 7 of mobile terminals of a second location server 3*b*, constituting the single parent server of the first location server 3*a*, comprises a mobile terminal record 8 associated with the mobile terminal sought Z.

The second step of regional determination 130 may be reiterated one or several times by going back up the hierarchical tree structure 6, i.e. by determining at each reiteration if the parent server of the server examined at the preceding iteration comprises a record associated with the mobile terminal sought.

All of the steps of regional determination 130 constitutes a set 140 of n-th steps of regional determination 150.

Each n-th step of regional determination 150 therefore consists in determining if the database 7 of mobile terminals of an n-th location server 3*d*, constituting the single parent server of an (n−1)-th server 3*c*, comprises a mobile terminal record 8 comprising address data 9 of the mobile terminal sought Z.

The reiteration of the n-th steps of regional determination 150 is stopped when the database 7 of mobile terminals of an n-th location server 3*d* comprises a mobile terminal record comprising address data of the mobile terminal sought.

In a first embodiment of the method for locating a mobile terminal, if the mobile terminal sought Z is not recorded in the database 7 of an (n−1)-th location server 3*c*, during an (n−1)-th step of regional determination, the n−1-th location server 3*c* transmits to the n-th location server 3*d*, constituting its single parent, a location request RL.

In a second embodiment of the method for locating a mobile terminal, if the mobile terminal sought Z is not recorded in the database 7 of an (n−1)-th location server 3*c*, during an (n−1)-th step of regional determination, the (n−1)-th location server 3*c* transmits to the recording server 2 an address AD, over the extended network 5, of the n-th location server 3*d* constituting its single parent, and the recording server 2 emits a location request RL to the n- th location server 3*d*.

In an alternative embodiment of the method for locating a mobile terminal according to the invention, when the database 7 of mobile terminals of a location server 3 comprises a mobile terminal record 8 comprising address data 9 of the mobile terminal sought Z, a local database 11 of the recording server 2 is updated 160 with said mobile terminal record 8.

In this alternative embodiment, the step of local determination 110, in order to determine if a mobile terminal sought is recorded with a recording server, further comprises a determination if the local database 11 of the recording server comprises a mobile terminal record comprising address data of the mobile terminal sought.

In this way, the addresses of the recording servers 2 communicating frequently together may be memorised in a local database creating a cache, in such a way as to accelerate the locating procedure.

Figure 3:
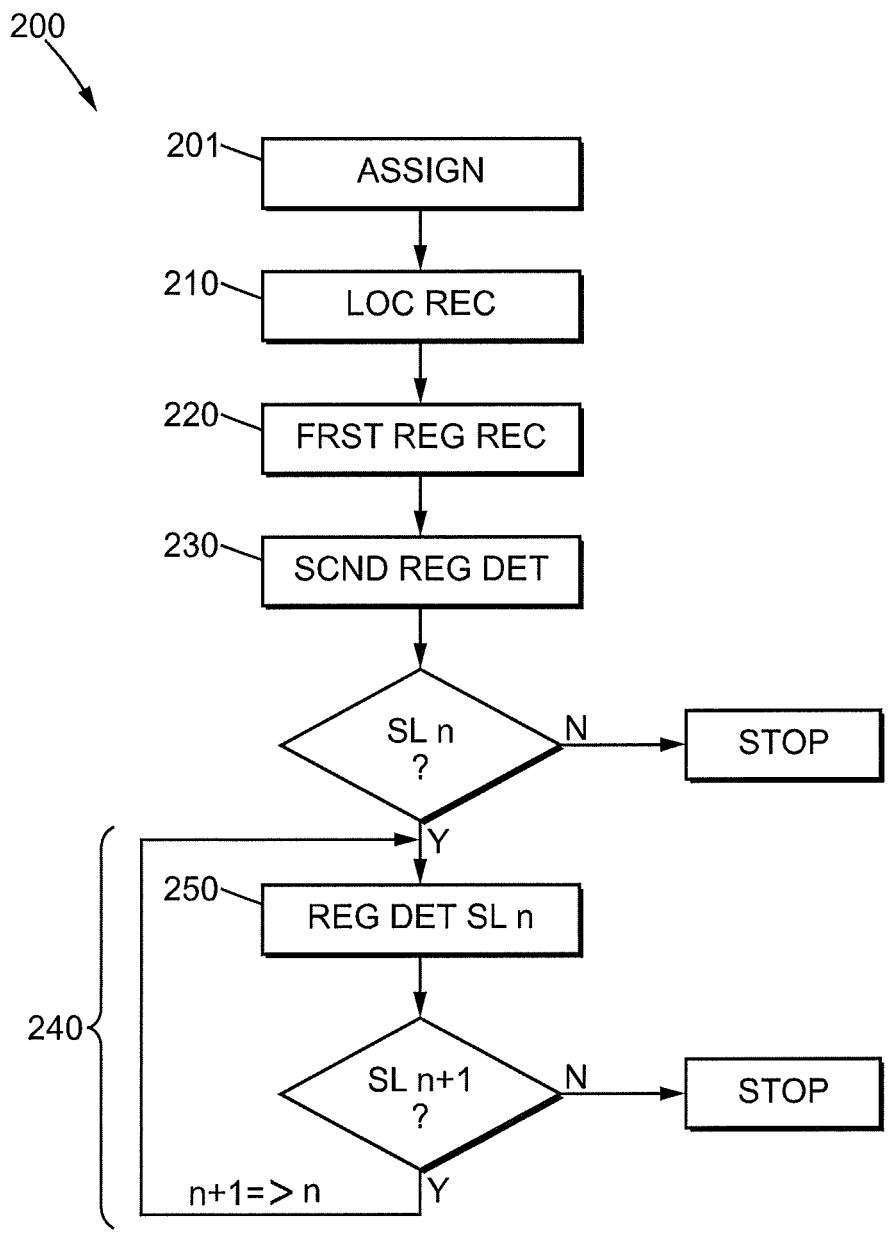
FIG. 3 is an organisational chart of a method for recording a mobile terminal in a system for locating mobile terminals, according to the invention.

FIG. 3 shows a method for recording 200 a mobile terminal 4 in a system for locating 1 mobile terminals 4.

In the embodiment shown in FIG. 3, the method first comprises a step of local recording 210 of a mobile terminal A to be recorded with a recording server 2.

During this step, the mobile terminal A is recorded with a recording server 2. The recording server 2 may then constitute a communication relay for exchanging messages M over the extended network 5 from the mobile terminal A.

The method for recording 200 further comprises a first step of regional recording 220 of the mobile terminal A to be recorded in the database 7 of mobile terminals of a first location server 3*a* constituting the single parent server 6*a* of the recording server 2.

The method for recording 200 further comprises a second step of regional recording 230 of the mobile terminal A to be recorded in the database of mobile terminals of a second location server 3*b* which constitutes the single parent server 6*a* of the first location server 3*a*.

In the method for recording 200 of FIG. 3, the second step of regional recording 230 is reiterated one or several times by going back up the hierarchical tree structure 6, with all of the steps of regional recording constituting a set 240 of n-th steps of regional recording 250.

Each n-th step of regional recording 250 consists in recording the mobile terminal A to be recorded in the database 7 of mobile terminals 4 of an n-th location server 3*d* constituting the single parent server 6*a* of an n−1-th location server 3*c*.

The reiteration of the n-th steps of regional recording is stopped when an n-th location server 3*d* does not have a parent server.

This n-th location server 3*d* may for example be the root location server 10.

In a first embodiment of a method for recording 200 according to the invention, each step of regional recording 250 comprises the emission of a recording request RE of a mobile terminal from a first server to the second server constituting the single parent 6*a* of the first server.

In this way, the mobile terminal to be recorded is recorded recursively by going back up the tree structure 6.

In a second embodiment of a method for recording 200 according to the invention, each step of regional recording 250 comprises the emission of a recording request RE of a mobile terminal from the recording server 2 to a location server 3.

In this second embodiment, the mobile terminal A to be recorded is recorded directly by the recording server 2 at each level of the tree structure 6.

In an embodiment, the method for recording 200 according to the invention may further comprise a step of assigning 201, carried out prior to the step of local recording 210.

This step of assigning 201 comprises the transmission of a request for assigning RA from the mobile terminal A to a location server 3.

This location server 3 may advantageously be the root location server 10. In this way, the mobile terminal A may only need to know a single address over the extended network 5, that of the root location server 10, in order to be recorded with the location system.

The step of assigning 201 then comprises the receiving on the mobile terminal A of an address AD, over the extended network 5, of a recording server 2 able to record the mobile terminal A.

In this embodiment, the step of local recording 210 then comprises the recording of the mobile terminal A with the recording server 2 of which the address AD was transmitted to the mobile terminal A.

Figure 4:
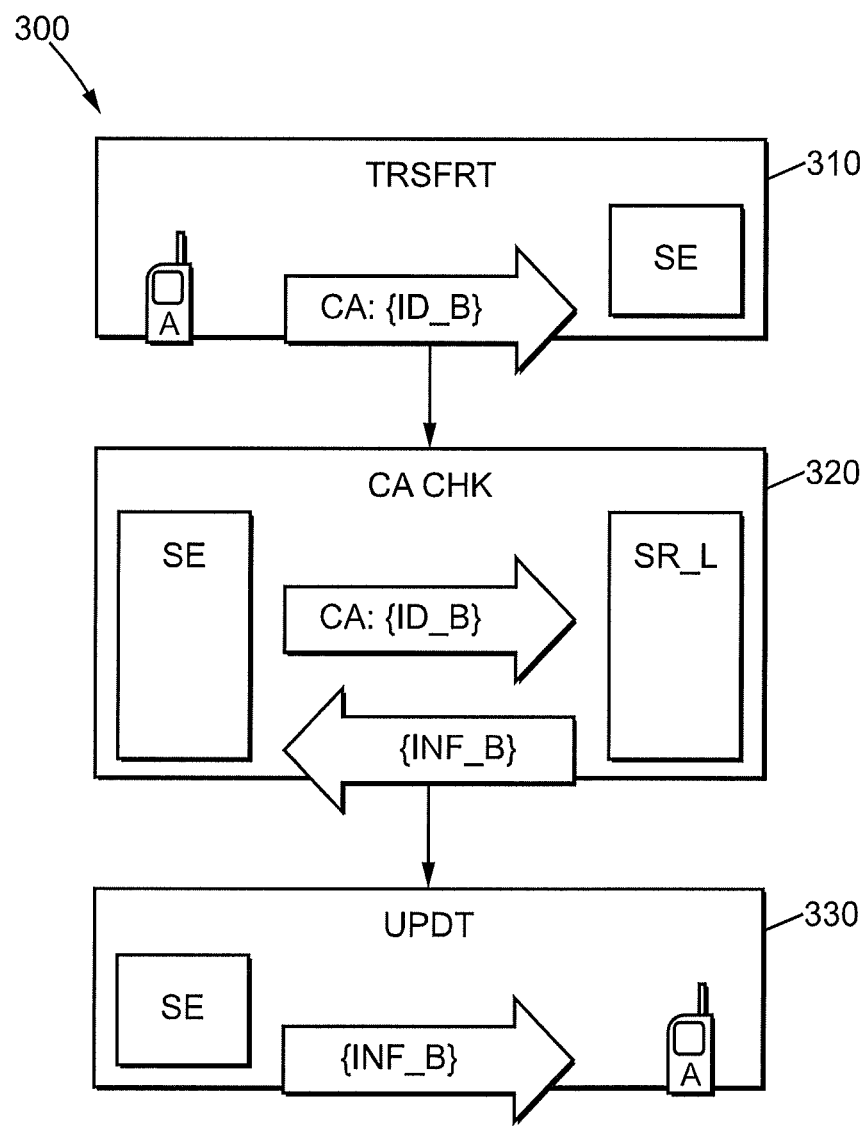
FIG. 4 is an organisational chart of a method of synchronising a mobile terminal with a system for locating mobile terminals, according to the invention.

Finally, FIG. 4 shows a method of synchronising 300 a mobile terminal A with a system for locating 1 of mobile terminals.

The method of synchronising 300 comprises a step of transferring 310 a plurality of address book CA records from a mobile terminal to be synchronised A to a recording server 2.

The recording server 2 is for example the recording server 2 with which the mobile terminal A is recorded.

At least one of the address book CA records comprises an identifier ID_B of mobile terminal contact Z.

An identifier ID_B of mobile terminal contact Z is for example a telephone number of the mobile terminal contact Z.

The method of synchronising 300 then comprises a step of sorting the address book 320 in order to determine, for each address book record CA comprising an identifier ID_B of mobile terminal contact Z, if the mobile terminal contact Z is recorded on a location server 3.

The location server 3 is for example the root location server 10. Indeed, the root location server 10 comprising, in an embodiment, all of the records 8 contained in each server of the tree structure 6, and, a mobile terminal contact Z having a low probability of already being recorded with a server of the tree structure 6, it is economical to transmit the requests directly to the root location server 10.

In an alternative embodiment, the step of sorting the address book 320 may be carried out by going back up the hierarchical tree structure 6, i.e. by determining, for each location server 3, if the mobile terminal contact Z is recorded on said server. If the mobile terminal is not recorded on said location server 3, the operation of determination is reiterated with the parent server of said location server.

The step of sorting the address book 320 may therefore comprise at least one operation of determining if the database 7 of mobile terminals 4 of a location server 3 comprises a mobile terminal record 8 comprising address data 9 of the mobile terminal contact Z.

The step of sorting the address book 320 makes it possible to define mobile terminal contact information INF_B.

Finally, the method of synchronising 300 comprises a step of updating 330 in order to transmit the mobile terminal contact information INF_B to the mobile terminal to be synchronised A.

As such, the method of synchronising 300 makes it possible to carry out an updating of the mobile terminal to be synchronised A.

What is claimed is:

1. System for locating mobile terminals comprising a plurality of recording servers and a plurality of location servers,
   each recording server adapted to communicate with a plurality of mobile terminals recorded with said recording server, for a communication relay,
   with the recording servers and the location servers configured to communicate together via an extended network and organised in a hierarchical tree of parent servers and child servers in such a way that:
   each recording server has a single parent server constituted by a location server;
   each location server has either a single parent server constituted by a location server, or no parent server;
   at least one location server among the plurality of location servers has a parent server; and
   each location server comprising a database of mobile terminals constituted of a plurality of mobile terminal records, each of said mobile terminal records comprising address data of a mobile terminal recorded with a descending recording server of said location server in the hierarchical tree;
   wherein a location server, parent in the hierarchical tree, comprises all of the records contained in a recording or location server, downstream of said parent location server in the hierarchical tree; and
   wherein the address data of a mobile terminal includes an address, over the extended network, of a recording server with which is recorded said mobile terminal.

2. System according to claim 1, wherein a single location server does not have a parent server and constitutes a root location server.

* * * * *